June 13, 1961  V. J. ALBANESE  2,988,740
MULTI-BAND ANTENNA TEST SHIELD
Filed March 16, 1959  4 Sheets-Sheet 3
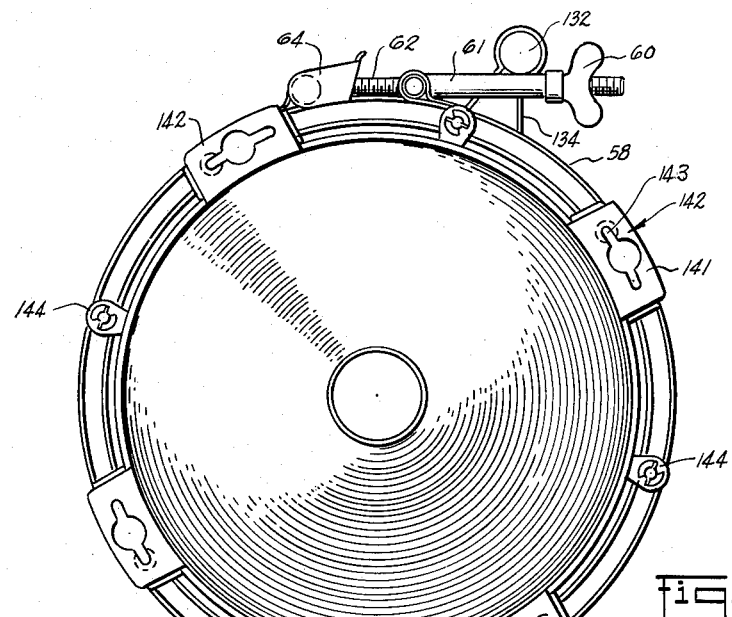
fig. 6.
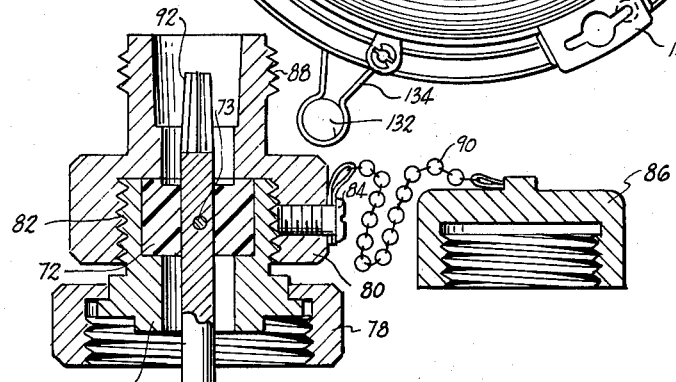
fig. 7.
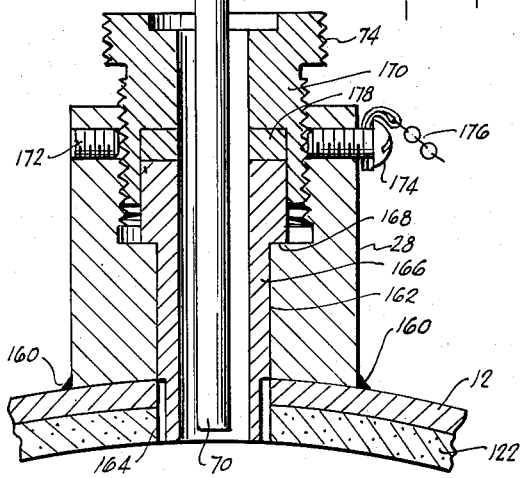
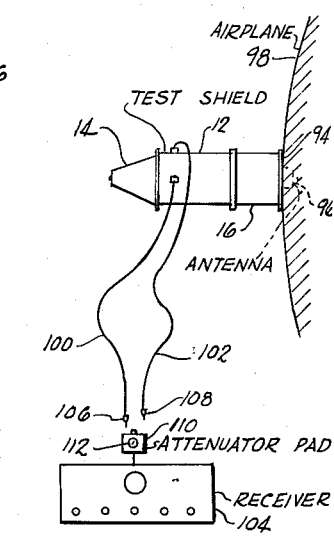
fig. 8.
INVENTOR.
VICTOR J. ALBANESE
BY
James and Franklin
ATTORNEYS

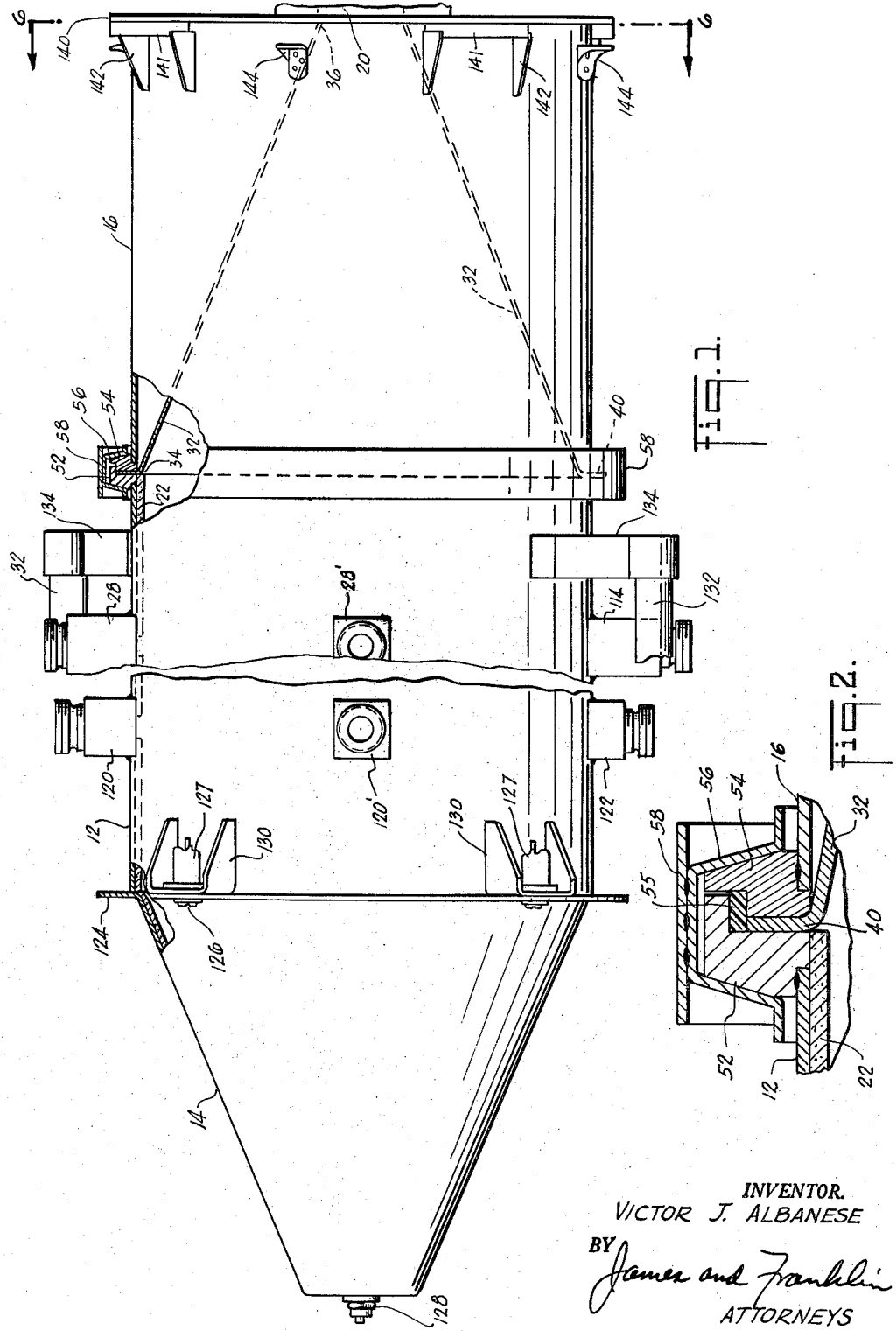

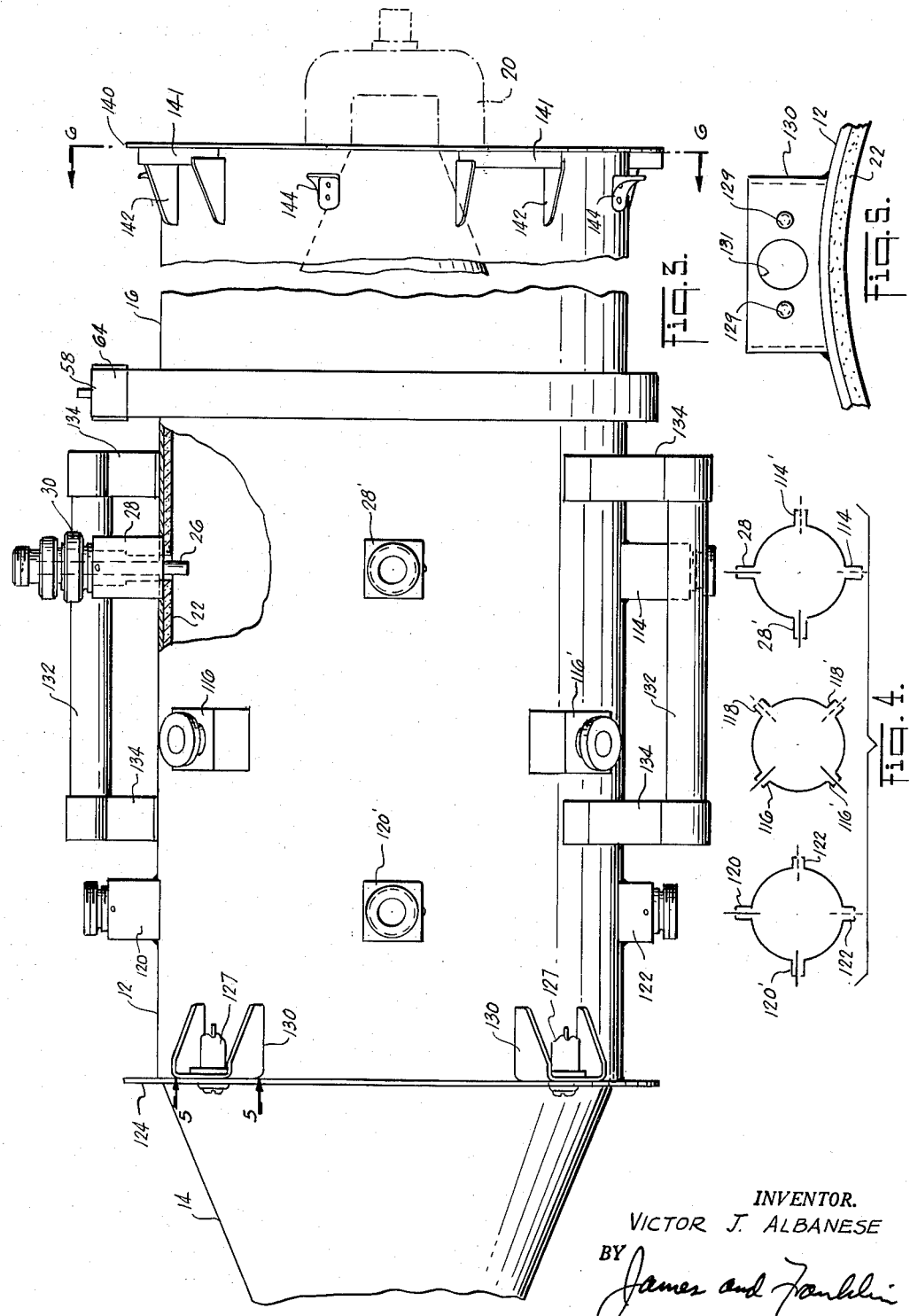

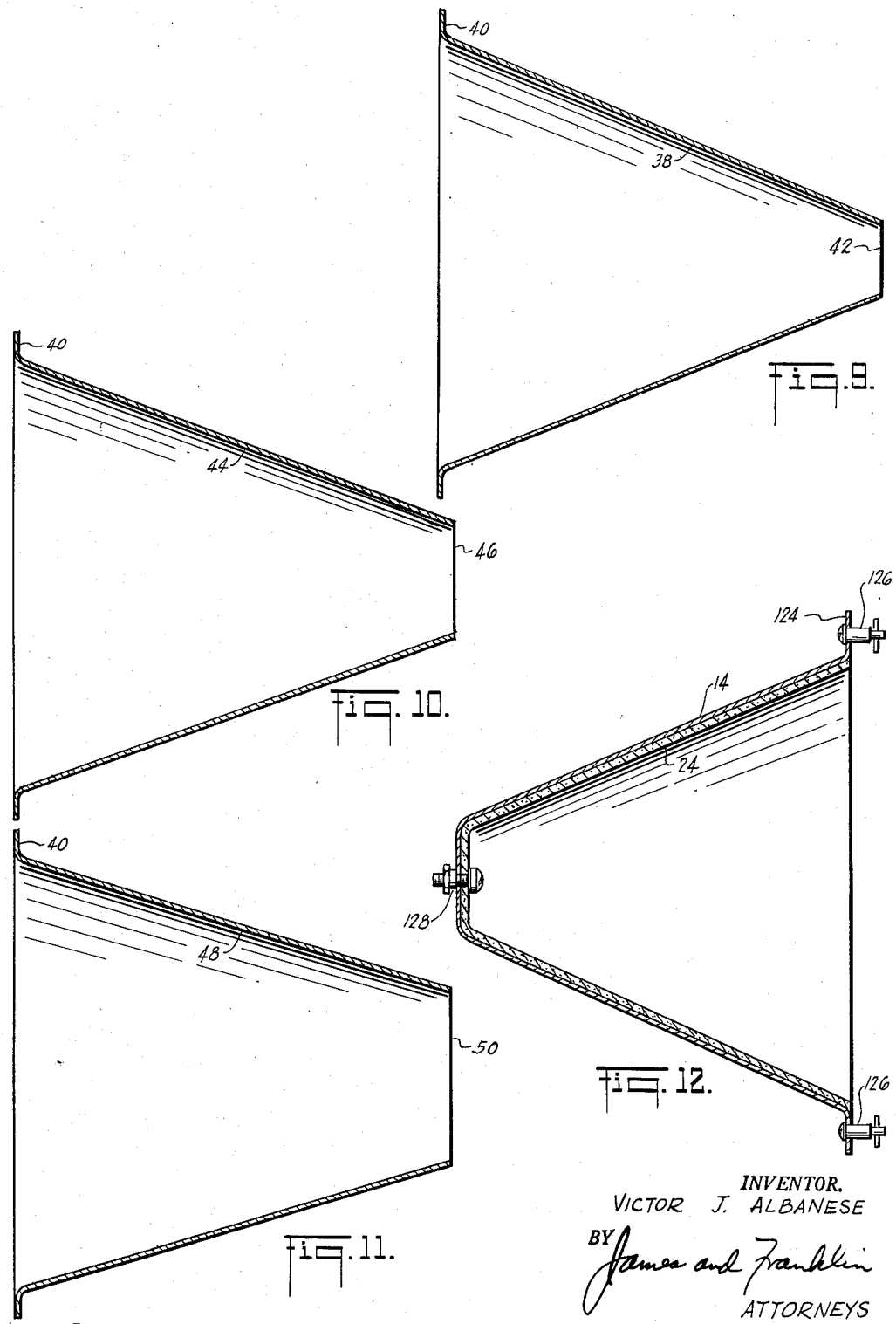

United States Patent Office
2,988,740
Patented June 13, 1961

2,988,740
MULTI-BAND ANTENNA TEST SHIELD
Victor J. Albanese, Valley Stream, N.Y., assignor to Bogart Manufacturing Corporation, Brooklyn, N.Y., a corporation of New York
Filed Mar. 16, 1959, Ser. No. 799,731
20 Claims. (Cl. 343—703)

This invention relates to antenna test shields, and more particularly to a multi-band test shield intended to be used for VHF and UHF, here more conveniently referred to as microwaves.

One object of the present invention is to temporarily shield the radiation from a microwave antenna during test, adjustment, or measurement of equipment. The antenna, typically on an aircraft, is shielded to protect nearby personnel against injury, and in order not to interfere with other equipment and other planes at or near the airfield.

Another object of the present invention is to provide means on an antenna shield for taking off a relatively minute fraction of the transmission power, to be used for measurement or test purposes. An ancillary object is to insure that the amount of power taken off is a dependable uniform fraction of the power being supplied to the antenna. With this arrangement the transmitter performance may be tested without actually transmitting beyond the shield, thereby avoiding interference with other equipment and personnel.

Still further objects are to provide an antenna test shield which may be used on any one of a considerable number of antennas transmitting in different frequency bands; to provide for fractional power takeoff in any one of these different frequency bands; and to insure that the amount of power taken off will be substantially the same uniform fraction of the power being transmitted regardless of the frequency band. At this point by "transmitted" I mean the power that would be transmitted were it not for absorption in the test shield.

Further objects of the invention are to provide an antenna test shield which is small in dimension and light in weight; which is capable of absorbing transmitted power of desired amount, say 500 watts; which will absorb the specified amount of power whether the transmission be continuous wave, or modulated, or noise modulated, all without overheating by reason of the absorption of power; which will minimize or avoid excessive reflection back through the antenna to the transmitter with a VSWR (voltage standing wave ratio) not significantly greater than the VSWR when the shield is omitted for open transmission; which provides a desired power step-down despite frequency change within any one band while remaining connected to the test shield at the connection or mount provided for that band (apart from the maintenance of desired power step-down when changing from one mount for one band to a different mount used for a different band); and to accomplish the foregoing objects despite problems arising from differences in polarization of the transmissions in different frequency bands.

To accomplish the foregoing general objects, and other more specific objects which will hereinafter appear, my invention resides in the antenna test shield, and the elements thereof, and their relation one to another, as are more particularly described in the following specification. The specification is accompanied by drawings in which:

FIG. 1 is an elevation of an antenna test shield embodying features of my invention, with the mid-part or body broken away;

FIG. 2 is a fragmentary detail section drawn to enlarged scale at the junction of the body and coupling portions of the shield;

FIG. 3 is an elevation similar to FIG. 1, but with the end parts of the shield broken away, in order to show the body portion in full;

FIG. 4 is a schematic diagram showing the angular disposition of the probe mounts and probes for different frequency bands;

FIG. 5 is explanatory of a detail;

FIG. 6 is a view taken in the plane of the line 6—6 of FIG. 3;

FIG. 7 is a section through a mount and a probe which are used for power takeoff;

FIG. 8 is a schematic view showing the relation of the antenna test shield to a receiver to which it is being connected;

FIGS. 9, 10 and 11 show different coupling cones which may be used for coupling the test shield to antennas transmitting in different frequency bands; and FIG. 12 is a section through the tail cone of the test shield.

Referring to the drawing, and more particularly to FIGS. 1 and 2, the antenna shield there shown comprises a cylindrical body portion 12, a conical tail portion 14 closing the outer end of the body portion 12, and a coupling portion 16 at the inner end of the body portion. The parts 12 and 14 together may be considered to be a metal shell which is closed at its outer end, and open at its inner end for connection at an antenna indicated by the numeral 20. The shell is lined with a lossy material, indicated at 22 in FIGS. 1 and 3, and indicated at 24 in FIG. 12. The particular lossy material here shown is powdered carbonyl iron bound in an epoxy resin. The coupling portion 16 is also made of metal, but preferably is not lined with lossy material.

Referring now to FIG. 3, the cylindrical body 12 is provided with a means generally designated 30 for taking off a relatively minute fraction of the transmission power, to be used for measurement purposes. In the present case the takeoff means consists of a probe 26 secured by part 30 on a mount 28 which facilitates ready attachment or detachment of the probe 26. The location of the probe, and its penetration into the shield body 12, are so selected that the amount of power taken off will be a dependable uniform fraction of the total power being transmitted. However, because of problems arising from polarization of the transmitted energy, it is preferred to provide the mounts in pairs which are orthogonally related. Thus, in the present case a second mount 28' corresponds to the mount 28, and is located in the same plane transverse to the longitudinal axis of the shield, but mount 28' will position the probe perpendicular to the position 26. By taking and adding together two such readings in all cases, any change in polarization is compensated.

The cylindrical coupling portion 16 (FIG. 1) serves satisfactorily for certain frequency bands. However, when dealing with substantially higher frequencies it becomes desirable to supplement the coupling portion 16 with additional coupling means or impedance matching means between the antenna 20 and the cylindrical body 12. This preferably takes the form of a metallic cone, shown here at 32. I prefer to provide a plurality of interchangeable coupling means, all having the same large diameter at 34 for connection to the shield or cylindrical body 12, but having different small diameters at 36 for connection at antennas operating in different frequency bands.

This is better shown in FIGS. 9, 10 and 11. The cone 38 shown in FIG. 9 differs somewhat from the cone 32 shown in FIG. 1, but it has the same large end, including the flange 40, but it has a somewhat smaller diameter at the small end 42. The cone 44 shown in FIG. 10 has the same large end and flange 40 as the cones 32 and 38, but it has a larger diameter at its small end 46. The cone 48 shown in FIG. 11 has the same large end and flange 40 as the cones 32, 38 and 44, but its small end 50 is still larger in diameter.

The antenna test shield here shown is designed for use with antennas operating in seven frequency bands ranging from about 1000 to 10,500 mc. This range comprises the L, the S, the C, and the X bands, and three of these are divided into their higher and lower regions, designated by prefixing the letter L for the lower region and the letter H for the higher region. More specifically the LL band ranges from 950 to 1525 mc.; the HL band ranges from 1450 to 2400 mc.; the LS band ranges from 2350 to 3600 mc.; the HS band ranges from 3550 to 5000 mc.; the C band ranges from 4900 to 7300 mc.; the LX band ranges from 7000 to 8800 mc.; and the HX band ranges from 8700 to 10,500 mc.

For the LL and HL bands the coupling cylinder 16 (FIG. 1) is used alone, that is, without any inside coupling cone. The coupling cone 48 shown in FIG. 11 is used for the LS band. The coupling cone 44 shown in FIG. 10 is used for the HS band. The coupling cone 32 shown in FIG. 1 is used for the C band. The coupling cone 38 shown in FIG. 9 is used for the LX and HX bands. In general, the small end of the cone is reduced in diameter to better match an antenna of higher frequency, and vice versa.

The method of attachment of the coupling cone and cylinder to the cylindrical shield body may be explained with reference to FIGS. 1, 2 and 3 of the drawing. The body 12 has a ring 52 secured thereto, as by brazing or welding. The cylinder 16 has a ring 54 similarly secured thereto. These rings may be brought and held together by a channel-section hoop 56, and the sides of the latter preferably slope in order to provide a wedge action. The hoop 56 may be tightened around the rings 52 and 54 by means of a band 58, and in FIG. 6 it will be seen that the band 58 may be tightened by means of a readily releasable clamp nut or wing nut 60 threadedly receiving a screw 62. A tubular spacer 61 may be slid over the screw ahead of the nut 60.

The channel band 56 preferably consists of a number of separate short lengths welded to the outer band 58, which is a continuous band. Screw 62 has a T-head anchored in a socket 64. The part 64 is connected to one end of band 58, and it will be evident that the nut 60 may be used to pull the ends of band 58 toward one another, thereby tightening the connection between the parts 12 and 16 of the shield. The peripheral clamp should require no further detail description, it being an article available in commerce and the particular clamp here shown in a "Marman" clamp made by Marman Division of Aeroquip Corp. of West Los Angeles, Calif.

When a coupling cone is used, the cone is simply inserted in the coupling cylinder 16 with the flange 40 resting against the ring 54. The flange is then received between the rings 52 and 54, and is tightly clamped in position when the clamp ring 58 is tightened as previously described.

In FIG. 2 metal cylinder 12 is permanently secured to ring 52, as by welding, and metal cylinder 16 is permanently secured to ring 54. The flange 40 of cone 32 is placed between the rings 52 and 54, and the latter then are wedged together by the channel section ring 56 which in turn is pulled inward by clamp ring 58.

The construction of a probe for use with the test shield may be described with reference to FIG. 7 of the drawing. The probe rod 70 is supported in insulation bushing 72 fixedly secured in a metal part 76. This carries a rotatable threaded ring 78 which is used to mount the probe on the threaded part 74 of one of the probe mounts 28. The probe assembly additionally includes a part 80 which may be assembled by a thread 82, and in such case is locked, as by means of screw 84. The probe rod 70 is held against longitudinal movement by a nylon pin 73. The cap 86 is not essential and is intended merely to protect the thread 88 when the probe is not in use. The cap may be held against loss by means of chain 90.

The thread 88 and the upper end 92 of rod 70 are appropriately dimensioned to receive a standard connector for a coaxial cable. This structure acts as the female half of a Type N connector, and it receives the male half of a Type N connector which latter is secured to the end of a coaxial cable.

The amount for the probe is also shown in FIG. 7. It comprises a metal block 28 which may be, say one inch square, and which is secured to the outside of the metal body 12, as by means of tack welding indicated at 160. The bore 162 is carried through the body 12 and its lining 122, as indicated at 164. A smooth metal bushing 166 is dropped into position and is seated at 168. This has the proper inside diameter to act with the probe rod 70 as a transmission line of proper impedance, in this case a 50 ohm line. The block 28 threadedly receives a bushing 170 which may be adjusted higher or lower, and its adjustment may be fixed by set screws 172 and 174. The latter may also be used to hold a flexible chain 176 leading to a dust cap intended to be placed over the threaded part 74 when the mount is not in use. The lower end of threaded bushing 170 is counterbored to receive the upper end of bushing 166, and any space left between these parts is filled by a metal shim 178 of suitable dimension. The purpose of the shim is to prevent a discontinuity along the 50 ohm line.

Referring now to FIG. 8 of the drawing, the antenna test shield 12, 14 is detachably secured by means of cylindrical coupler 16 to the antenna ring 94 of an antenna 96 used on an airplane the fuselage wall of which is indicated at 98. A coaxial cable 100 is connected to a probe on a mount, and another cable 102 is connected to an orthogonally related probe on a companion mount. A pair of like probes and cables are used because it is more convenient to change connection down at the receiver 104 than up at the shield 12. The cables terminate in connectors 106 and 108. Either of these may be connected directly to a receiver 104, but for a reason explained later, I prefer to provide an attenuator pad 110 in series with the receiver, and thus either cable is connected to the attenuator pad, and the latter to the receiver. As previously explained, two readings are preferably taken with the probes in orthogonal relation, and the readings may be summed, thereby taking care of any change in polarization.

Referring now to FIGS. 3 and 4 of the drawing, the mounts 28 and 28' are in the same transverse plane, but are at right angles to one another. These may be used for the LS band. The mounts 114 and 114' may be used for the HS band and the C band. These mounts may all be located in a common transverse plane, and a desired difference in pickup may be obtained by a difference in effective length of the probe. However, it is convenient to use the same probe (or two like probes as in FIG. 8) at all times, and this may be done by changing the mounts. In the present case the mount 114 is higher than the mount 28, and consequently the probe does not extend as far into the test shield. The block 28 and its bushing 74 (FIG. 7) are made of nominally correct height while using a shim 178 which is, say, 0.125" thick, and therefore a final adjustment either up or down may be made later at the shim 178.

The mounts 116 and 116' (FIG. 3) may be used for the HX band. The mounts 118 and 118' (FIG. 4) are of different height from 116, 116' and may be used for the LX band. Here again, the mounts are orthogonally related, and all four mounts preferably are in a common transverse plane. It will be noted that these four probes are not disposed vertically and horizontally, and in this case are specifically at 45° relative to the mounts 28 and 114. This is desirable in order that the recesses or discontinuities in the inside surface of the shield at the probes be out of alignment with those of the probes in the next transverse plane. The discontinuities are staggered.

The mounts 120 and 120' are used for the HL band, and the mounts 122 and 122' are used for the LL band. Here again it will be noted that the height of the amount 122 differs from the height of the mount 120, but these heights need not necessarily differ greatly from the heights of other mounts which are displaced axially along the cylinder, because a difference in the amount of pickup may result from the displacement along the cylinder, as well as from the amount of radial penetration of the probe into the cylinder.

It is obviously convenient and therefore an overall objective to provide a power step-down ratio which is uniform for the different frequency bands. In the specific case here shown, the transmitter output is 500 watts, and the desired drop in power takeoff is to be 40 db, bringing the power down to only 50 milliwatts, which is a good level for safe feed into the detection or receiver system indicated at 104 in FIG. 8. However, because it is also convenient to use the same probe in all of the mounts, and to locate the mounts in only three different transverse planes, there is some non-uniformity which in the present case is held to a tolerance of plus or minus 2½ db on the desired 40 db.

To assist in obtaining this result the attenuator 110 shown in FIG. 8 may be used, this affording in the present case a fixed attenuation of 3 db. The test shield may be provided with a calibration curve showing the coupling in db for each frequency band, and also showing whether or not the attenuator should be used for the particular frequency band. With the help of the attenuator 110, the actual tolerance or variation afforded at the test probe mounts is kept within plus or minus 2½ db. Without the attenuator the tolerance may vary between plus 2½ db and minus 5½ db.

The coupling here referred to is the sum of the two complementary or orthogonally related readings, this sum being referred or related to the input or transmitted power. Expressed as a formula, it would read as follows:

$$\text{Coupling in } db = 10 \log_{10} \frac{P_1 + P_2}{P}$$

in which $P_1$ is the power reading in watts from one probe, $P_2$ is the power reading in watts from the other probe, and $P$ is the power in watts being transmitted or radiated from the antenna.

A tolerance of plus or minus 2½ db, while rough or approximate for some purposes, is considered very good for the present purpose, in which an antenna shield which is small and light and handy to use, is employed over an exceedingly broad frequency range, and with a variety of antennas.

As so far described, the body of the shield with its orthogonally related probes need not be rotatable relative to the antenna. However, for certain special and additional purposes the body and probes are preferably rotatable. It will be understood that by merely loosening the wing nut 60 of the hoop 58, the body and tail cone may be rotated around the axis of the shield. To facilitate this rotation, the parts shown in FIG. 2 may additionally include a bearing ring 55. This may be made of a plastic material, and it takes the wear which otherwise would result from direct metal to metal contact during rotation. In the present case the bearing ring 55 is made of "Fluorosint," this being a sintered form of "Teflon." The usual Du Pont Teflon has a high coefficent of expansion, and when subjected to an elevated temperature as in the present case, it expands and contracts excessively relative to the expansion and contraction of the adjacent aluminum. However, the sintered Teflon (Fluorosint) has a coefficient of expansion substantially the same as that of aluminum, and is therefore a highly advantageous material to use for the present purpose.

The resulting rotation of the probe makes it possible to align one probe for maximum reading, knowledge of which may be wanted. In the case of an antenna which results in a tilted beam, the rotation makes it possible to determine the maximum reading, or/and the maximum sum of two orthogonal readings, whereas without rotation the readings might be taken at a point remote from the tilted beam.

The said rotation may be used to determine the polarization of an antenna, should that information be of interest. Also when dealing with a frequency sweep, two outputs may be fed simultaneously to two meters to help determine how fast the frequency sweep is, and the present shield may be rotated to a position which provides equal probe coupling to the two meters.

For convenience in manufacture, the tail cone 14 is preferably made separately from the cylindrical body 12. Referring to FIG. 12 the tail cone 14 is made of drawn or spun metal, preferably aluminum, and is provided with a flange 124. The latter has male connectors 126. The screw 128 at the end of the tail cone holds the lossy material or lining 24 in position.

Referring now to FIG. 1 or 3 of the drawing, the male connectors 126 (not shown) are received by female connectors 127 carried by abutments 130. These may be formed of sheet metal bent to U-shape to provide so-called gussets which are welded on the outside of metal cylinder 12. The latter is also made of sheet metal, preferably aluminum.

The gussets 130 receive quick-disconnect fasteners which in the present case are Camloc fasteners made by Camloc Corportation. The male parts 126 are carried by the flange 124 as is best shown in FIG. 12. The female parts 127 are carried by the gussets 130, being riveted thereto, as shown at 129 in FIG. 5. In assembling the parts, the large center hole 131 (FIG. 5) receives the male fasteners 126 which need be turned only a one-quarter turn to lock.

For convenience in handling the antenna shield, the body 12 may be provided with a pair of diametrically opposed handles 132. These may be made of "Figerglas" or other suitable material, the ends of the handles being held by brackets 134 which are riveted or welded on the outside of the cylindrical body 12. As will be seen in FIG. 6, the handles are preferably oriented at an angle in order not to interfere with the probes and probe mounts.

The complete antenna shield assembly is detachably connected to the antenna ring 140 of the transmission equipment by means of gussets 142. Referring to FIG. 6 it will be seen that these gussets preferably have double keyhole shaped slots 143. These gussets are assembled of a thick wall 141 (FIG. 3) and two approximately triangular side supports. The thick part 141 has the keyhole slot.

Each antenna ring 140 has four headed screws, and these are backed out enough to pass through the holes in the gussets, whereupon the antenna may be rotated slightly and the screws tightened.

Between the gussets 142 there are four brackets 144 which act as the female parts of quick-disconnect fasteners which are specifically "Camloc" fasteners made by Camloc Corporation. These are intended merely to receive a flat circular plate or dust cover which is used when the antenna shield is not in use. The dust cover is provided with male Camloc fasteners like those shown at 126 in FIG. 12.

The transmission antenna forms no part of the present invention, and various kinds are used. In one form the antenna may be a helix in a metal cavity which is closed at the front by a Fiberglas disc. In another form it may be a horn or a slot. The antenna may be linearly polarized, as in the case of a slot antenna. The different antennas produce somewhat different shapes of radiation beam, and different polarization, but all of these will be successfully shielded by the present shield, and will be successfully tapped for a minute fraction of the transmitted power in a known or predictable step-down ratio for test measurement purposes. Different calibration curves may be provided for different types of antenna but the apparatus need not be changed.

A very radical change in antenna type, as for example a change to a loop or scimiter, may require a change in the shape and size of the coupling adapter between the antenna and the shield body, and may also require a change in the position and penetration of the probe.

In the particular case here shown, the cylindrical body of the shield is twelve inches long and eight inches in diameter. The coupling portion is eight inches long and eight inches in diameter. The conical tail portion is seven inches long and two inches in diameter at the small end and eight inches in diameter at the large end. The lining of lossy material is one-eighth inch thick.

The adapter or coupling cones all have an eight inch opening at the large end, and they are all eight inches long. For the LS band the small diameter is 3.030 inches. For the HS band the small diameter is 2.232 inches. For the C band the small diameter is 1.916 inches. For the LX and HX bands the small diameter is 1.194 inches. For the LL and HL bands no cone is used.

The probes are located in three planes which are three inches apart and two of the planes are three inches from the ends of the body. The insertion length or penetration of the probe within the lossy lining is as follows:

| Frequency band | Penetration in inches |
| --- | --- |
| LL | 0.846 |
| HL | 0.592 |
| LS | 0.285 |
| HS | 0.220 |
| C | 0.220 |
| LX | 0.439 |
| HX | 0.638 |

In typical cases, the antenna, say helical or horn, when radiating into free space, is permitted a VSWR of 1.50, and the present antenna shield when added to the antenna increases the reflection only slightly, if at all, the VSWR being kept within 1.75. Sometimes the VSWR is less than before.

It is believed that the construction and operation and method of use of my improved microwave antenna test shield, as well as the advantages thereof, will be apparent from the foregoing detailed description. It will also be apparent that while I have shown and described the invention in a preferred form, changes may be made in the structure shown, without departing from the scope of the invention as sought to be defined in the following claims.

In the claims the reference to different mounts receiving "the same probe" is not intended to exclude the successive use of two identical probes in orthogonal relation, as illustrated in FIG. 8, this being merely for greater convenience of manipulation, as explained above.

I claim:

1. An antenna shield for microwaves comprising a metal shell closed at the outer end, and open at the inner end for connection at the antenna, said shell comprising a cylindrical body portion, a conical tail portion closing the outer end, and a coupling portion at the inner end of said cylindrical portion, said body and tail portions being lined with a lossy material.

2. An antenna shield for microwaves comprising a metal shell closed at the outer end, and open at the inner end for connection at the antenna, said shell comprising a cylindrical body portion, a conical tail portion closing the outer end, and a coupling portion at the inner end of said cylindrical portion, said coupling portion being unlined and said body and tail portions being lined with a lossy material, said lossy material being powdered carbonyl iron in an epoxy resin.

3. An antenna test shield for microwaves, said shield comprising a metal shell closed at the outer end, and open at the inner end for connection at the antenna, said shell comprising a cylindrical body portion, a conical tail portion closing the outer end, and a coupling portion at the inner end of said cylindrical portion, said body and tail portions being lined with a lossy material, the body portion of said shield having means for taking off a relatively minute fraction of the transmission power to be used for measurement purposes, the amount taken off being a dependable uniform fraction of the transmission power.

4. An antenna test shield for microwaves, said shield comprising a metal shell closed at the outer end, and open at the inner end for connection at the antenna, said shell comprising a cylindrical body portion, a conical tail portion closing the outer end, and a coupling portion at the inner end of said cylindrical portion, said coupling portion being unlined and said body and tail portions being lined with a lossy material, the body portion of said shield having means for taking off a relatively minute fraction of the transmission power to be used for measurement purposes, the amount taken off being a dependable uniform fraction of the transmission power, said means being a probe, and said shield being provided with a mount for ready attachment or detachment of the probe.

5. A wide range multi band microwave antenna shield comprising a metal shell closed at the outer end, and open at the inner end for connection at the antenna, said shell being lined with a lossy material, and a coupling cone having a large diameter for connection to the metal shell and having a small diameter for connection at an antenna, and said cone being one of a plurality of interchangeable coupling cones all having the same large diameter for connection to the metal shell and having different small diameters for connection at antennas of different frequency band.

6. A wide range multi band microwave antenna shield comprising a metal shell closed at the outer end, and open at the inner end for connection at the antenna, said shell being lined with a lossy material, said shell comprising a cylindrical body portion, a tail portion closing the outer end, and a coupling portion at the inner end of said cylindrical portion, said coupling portion being unlined and said body and tail portions being lined, and a coupling cone having a large diameter for connection to the metal shell and having a small diameter for connection at an antenna, and said cone being one of a plurality of interchangeable coupling cones all having the same large diameter for connection to the cylindrical body, and having different small diameters for connection at antennas of different frequency band, said cones being dimensioned to fit inside the aforesaid coupling portion.

7. A wide range multi band microwave antenna shield comprising a metal shell closed at the outer end, and open at the inner end for connection at the antenna, said shell being lined with a lossy material, said material being powdered carbonyl iron in an epoxy resin, said shell comprising a cylindrical body portion, a conical tail portion closing the outer end, and a coupling portion at the inner end of said cylindrical portion, said coupling portion being unlined and said body and tail portions being lined, and a coupling cone having a large diameter for connection to the metal shell and having a small diameter for connection at an antenna, and said cone being one of a plurality of interchangeable coupling cones all having the same large diameter for connection to the cylindrical body, and having different small diameters for connection at antennas of different frequency band, said cones being unlined and being dimensioned to fit inside the aforesaid coupling portion.

8. A wide range multi band microwave antenna test shield, said shield comprising a metal shell closed at one end, and open at the other end for connection to the antenna, said shell being lined with a lossy material, said shell comprising a cylindrical body portion, a conical tail portion to close the same, and a coupling portion at the other end of said cylindrical portion, said coupling portion being unlined and said body and tail portions being lined, the body portion of said shield having a plurality of different pairs of mounts to detachably receive a probe for taking off a relatively minute fraction of the transmission power to be used for measurement purposes, the two mounts of each pair being in a common plane which is perpendicular to the axis of the shield, and being 90° apart so that their probe positions are orthogonally related, the amount of power taken off at any pair of mounts being a dependable uniform fraction of the transmission power, and being substantially the same fraction at all of the different frequency bands, and a coupling cone having a large diameter for connection to the metal shell and having a small diameter for connection at an antenna, and said cone being one of a plurality of interchangeable coupling cones all having the same large diameter for connection to the cylindrical body and having different small diameters for connection at antennas of different frequency band, said cones being dimensioned to fit inside the aforesaid coupling portion.

9. A wide range multi band microwave antenna test shield, said shield comprising a metal shell closed at one end, and open at the other end for connection to the antenna, said shell being lined with a lossy material, said shell comprising a cylindrical body portion, a conical tail portion to close the same, and a coupling portion at the other end of said cylindrical portion, said coupling portion being unlined and said body and tail portions being lined, the body portion of said shield having a plurality of different mounts to detachably receive a probe for taking off a relatively minute fraction of the transmission power to be used for measurement purposes, the amount taken off at any mount being a dependable uniform fraction of the transmission power, and the positions and dimensions of the mounts for different frequency bands being such that substantially the same fraction of power is taken off at the different frequency bands by the said probe, and a coupling cone having a large diameter for connection to the metal shell and having a small diameter for connection at an antenna, and said cone being one of a plurality of interchangeable coupling cones all having the same large diameter for connection to the cylindrical body and having different small diameters for connection at antennas of different frequency band, said cones being dimensioned to fit inside the aforesaid coupling portion.

10. A wide range multi band microwave antenna test shield, said shield comprising a metal shell closed at one end, and open at the other end for connection to the antenna, said shell being lined with a lossy material, said shell comprising a cylindrical body portion, a conical tail portion to close the same, and a coupling portion at the other end of said cylindrical portion, said coupling portion being unlined and said body and tail portions being lined, the body portion of said shield having a plurality of different pairs of mounts to detachably receive a probe for taking off a relatively minute fraction of the transmission power to be used for measurement purposes, the two mounts of each pair being in a common plane which is perpendicular to the axis of the shield, and being 90° apart so that their probe positions are orthogonally related, the amount of power taken off at any pair of mounts being a dependable uniform fraction of the transmission power, and the positions and dimensions of the pairs of mounts for different frequency bands being such that substantially the same fraction of power is taken off at the different frequency bands by said probe, and a coupling cone having a large diameter for connection to the cylindrical body and having a small diameter for connection at an antenna, said cone being dimensioned to fit inside the aforesaid coupling portion, and said cone being one of a plurality of interchangeable coupling cones all having the same large diameter for connection to the cylindrical body and having different small diameters for connection at antennas of different frequency band, said cones being unlined and being dimensioned to fit inside the aforesaid coupling portion.

11. An antenna test shield as defined in claim 8, in which there are four orthogonally related probe mounts in a single transverse plane, two of said mounts acting as an orthogonal pair for one frequency band, and the remaining two acting as an orthogonal pair for a different frequency band.

12. An antenna test shield as defined in claim 8, in which the probe mounts of one pair position the probe at a different radial distance from the axis of the cylinder than another pair of probe mounts, whereby the same length probe may be used with the different mounts with the same effect as though probes of different length were being used.

13. An antenna test shield as defined in claim 6, in which the coupling cones and coupling cylinder are secured to the cylindrical body by means of a readily releasable peripheral clamp, thereby facilitating change from one coupling cone to another.

14. A wide range multi-band microwave antenna test shield for use with high power transmitters, said shield comprising a shield having a plurality of different mounts to detachably receive the same probe for taking off a relatively minute fraction of the transmission power to be used for measurement purposes, the amount of power taken off being a dependable uniform fraction of the transmission power, the different mounts being used for different frequency bands, and the said mounts so differing in location and height that substantially the same fraction of power is taken off at all of the different frequency bands by the same probe.

15. A wide range multi-band microwave antenna test shield for use with high power transmitters, said shield comprising a metal shield having a longitudinal axis and having a circular cross section in a plane perpendicular to said axis, said shield having a plurality of different pairs of mounts to detachably receive the same probe for taking off a relatively minute fraction of the transmission power to be used for measurement purposes, the two mounts of each pair being in a common plane which is perpendicular to the axis of the shield, and being 90° apart so that their probe positions are orthogonally related, the amount of power taken off being a dependable uniform fraction of the transmission power, the different pairs of mounts being used for different frequency bands, and said pairs of mounts so differing in location and height that substantially the same fraction of power is taken off at all of the different frequency bands by the same probe.

16. A wide range multi-band microwave antenna test shield for use with high power transmitters, said shield comprising a metal shield lined with a thick coating of lossy material made of powdered carbonyl iron in an epoxy resin, said shield having a plurality of different mounts to detachably receive the same probe for taking off a relatively minute fraction of the transmission power to be used for measurement purposes, the amount of power taken off at any mount being a dependable uniform fraction of the transmission power, the different mounts being used for different frequency bands, and the positions and heights of the mounts for different frequency bands being such that substantially the same fraction of power is taken off at the different frequency bands by the same probe.

17. A wide range multi-band microwave antenna test shield for use with high power transmitters, said shield comprising a metal shield lined with a thick coating of lossy material made of powdered carbonyl iron in an epoxy resin, said shield having a longitudinal axis and having a circular cross section in a plane perpendicular to said axis, said shield having a plurality of different pairs of mounts to detachably receive the same probe for taking off a relatively minute fraction of the transmission power to be used for measurement purposes, the two mounts of each pair being in a common plane which is perpendicular to the axis of the shield, and being 90° apart so that their probe positions are orthogonally related, the amount of power taken off at any pair of mounts being a dependable uniform fraction of the transmission power, the different pairs of mounts being used for different frequency bands, and the positions and heights of the pairs of mounts for different frequency bands being such that substantially the same fraction of power is taken off at the different frequency bands by the same probe.

18. An antenna test shield as defined in claim 15, in which the probe mounts in one transverse plane are angularly displaced at an angle of about 45° to the probe mounts in a next transverse plane.

19. An antenna test shield as defined in claim 15, in which there are four orthogonally related probe mounts in a single transverse plane, two of said mounts having the same height and acting as an orthogonal pair for one frequency band, and the remaining two having the same height as each other but being of a height different from that of the first pair and acting as an orthogonal pair for a different frequency band.

20. A wide range multi-band microwave antenna test shield comprising a cylindrical shield having a longitudinal axis and having a plurality of different pairs of mounts for use with different frequency bands to detachably receive a probe for taking off a relatively minute fraction of the transmission power to be used for measurement purposes, the two mounts of each pair being in a common plane which is perpendicular to the axis of the shield, and being 90° apart so that their probe positions are orthogonally related, the probe mounts of one pair serving to position the probe at a different radial distance from the axis of the cylinder than the probe mounts of another pair, whereby the same length probe may be used with the different mounts with the same effect as though probes of different length were being used, the amount of power taken off being a dependable uniform fraction of the transmission power, and being substantially the same fraction at the different mounts for the different frequency bands.

References Cited in the file of this patent

UNITED STATES PATENTS

| | | |
|---|---|---|
| 2,490,782 | Collup | Dec. 13, 1949 |
| 2,702,366 | Ginzton | Feb. 15, 1955 |
| 2,820,127 | Argento et al. | Jan. 14, 1958 |